United States Patent Office 3,099,661
Patented July 30, 1963

3,099,661
N-(2-TETRAHYDROPYRANYL) AND N-(2-TETRA-HYDROFURANYL) 2-AMINOACETAMIDES
Kenneth Wayne Ratts, Overland, Mo., assignor to Monsanto Chemical Company, St. Louis, Mo., a corporation of Delaware
No Drawing. Filed Nov. 22, 1961, Ser. No. 154,364
5 Claims. (Cl. 260—345.7)

This invention relates to new and useful 2-aminoacetamides.

The 2-aminoacetamides of this invention can be represented by the formula

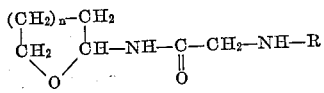

wherein n is a whole number from 1 to 2 and wherein R is hydrogen or a lower aliphatic (or acyclic) hydrocarbon radical (e.g. methyl, ethyl, propyl, butyl, amyl, allyl, methallyl, butenyl, pentenyl, propargyl, etc. and the various isomeric forms thereof containing 1 to 5 carbon atoms).

Among the 2-aminoacetamides contemplated by this invention are

N-(2-tetrahydrofuranyl) 2-aminoacetamide
N-(2-tetrahydropyranyl) 2-aminoacetamide
N-(2-tetrahydrofuranyl) 2-(methylamino)acetamide
N-(2-tetrahydropyranyl) 2-(ethylamino)acetamide
N-(2-tetrahydrofuranyl) 2-(isopropylamino)acetamide
N-(2-tetrahydropyranyl) 2-(n-butylamino)acetamide
N-(2-tetrahydrofuranyl) 2-(isoamylamino)acetamide
N-(2-tetrahydropyranyl) 2-(allylamino)acetamide
N-(2-tetrahydrofuranyl) 2-(allylamino)acetamide
N-(2-tetrahydropyranyl) 2-(propargylamino)acetamide To prepare 2-aminoacetamides of the foregoing structural formula wherein R is a lower aliphatic (or acyclic) hydrocarbon radical a primary amine of the formula $RNH_2$ is reacted with a 2-chloroacetamide of the formula

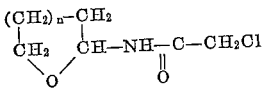

wherein n is a whole number from 1 to 2. While a wide range of reaction temperatures can be employed provided the system is fluid (i.e. above the freezing point of the system up to and including the boiling point of the system) it is preferred to employ a reaction temperature in the range of from about 25° C. to about 150° C. Where and when desired an inert organic solvent (e.g. diethylether, benzene, acetone, dimethyl sulfoxide, dimethyl formamide) can be used.

The above described 2-chloroacetamides precursors are prepared by reacting α-chloroacetamide, i.e.

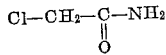

with dihydropyran or dihydrofuran in the presence of a small amount of hydrogen chloride and to illustrate such is the following:

EXAMPLE A

To a suitable reaction vessel equipped with a thermometer, agitator and reflux condenser is charged 47 parts by weight (substantially 0.5 mol) of α-chloroacetamide, 42 parts by weight (substantially 0.5 mol) of 2,3-dihydropyran, and a mixture of approximately 150 parts by weight of benzene and 50 parts by weight of dimethylformamide. While agitating and at room temperature there is added approximately 0.4 part by weight of hydrogen chloride in approximately 1.75 parts by weight of diethyl ether. The mixture is then refluxed for 2 hours. Thereafter the reaction mass is cooled to room temperature, filtered, and the filtrate subjected to vacuum distillation at 60° C. to remove the volatiles. The residue, a solid, is N-(2-tetrahydropyranyl) α-chloroacetamide. Upon recrystallizing this solid from benzene the melting point is found to be 94–95° C.

To illustrate the preparation of 2-aminoacetamides of the foregoing formula wherein R is a lower aliphatic (or acyclic) hydrocarbon radical is the following:

Example I

To a suitable reaction vessel equipped with a thermometer and agitator is charged 22.8 parts by weight of allylamine and 72 parts by weight of diethyl ether. Over a 15 minute period and while maintaining the charge at about 5° C. is added with agitation 35.5 parts by weight of N-(2-tetrahydropyranyl) 2-chloroacetamide. The reaction mass is then agitated for 3.5 hours while maintaining the temperature at about 5° C. The reaction mass is then permitted to stand at room temperature overnight. The supernatant liquid is decanted and the residue extracted with several portions of diethylether. The extracts and the supernatant liquid are combined and subjected to vacuum distillation to remove the diethylether and other volatiles. The residue, an amber oil, is N-(2-tetrahydropyranyl) 2-(allylamino)acetamide.

Example II

Employing the procedure of Example I but replacing N-(2-tetrahydropyranyl) 2-chloroacetamide with a substantially equimolecular amount of N-(2-tetrahydrofuranyl) 2-chloroacetamide there is obtained N-(2-tetrahydrofuranyl) 2-(allylamino)acetamide.

Example III

Employing the procedure of Example I but replacing allylamine with a substantially equimolecular amount of ethylamine there is obtained N-(2-tetrahydropyranyl) 2-(ethylamino)acetamide.

Example IV

Employing the procedure of Example I but replacing allylamine with a substantially equimolecular amount of n-butylamine there is obtained N-(2-tetrahydropyranyl) 2-(n-butylamino)acetamide.

The 2-aminoacetamides of the foregoing formula wherein R is hydrogen are prepared from the appropriate 2-chloroacetamide of the formula

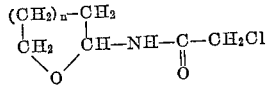

according to the Gabriel synthesis and to illustrate such is the following:

Example V

To a suitable reaction vessel equipped with a thermometer and agitator is charged 18.5 parts by weight of potassium phthalide and 75 parts by weight of dimethylformamide. This charge is heated to about 50° C. and with agitation is added 17.8 parts by weight of N-(2-tetrahydropyranyl) 2-chloroacetamide in 50 parts by weight of dimethylformamide. The mass is then heated at 65–70° C. for 2 hours, poured into 250 parts by weight of cold water, and then filtered. The filter cake is washed with water and dried. The dried product (25.9 parts by weight) is N - (2 - tetrahydropyranyl) 2-phthalimidoacetamide, which after two recrystallizations from absolute alcohol gave a melting point of 231.4–232.0° C.

To a suitable reaction vessel equipped with a thermometer, agitator and reflux condenser is charged 14.4 parts by weight of N-(2-tetrahydropyranyl) 2-phthalimidoacetamide and 3 parts by weight of hydrazine hydrate in the form of an 85% by weight aqueous solution. The so charged mass is refluxed for 2 hours and then cooled to about 40° C. where after 5 parts by weight 38% hydrochloric acid is added and the mixture agitated for about 10 minutes. The mass is cooled to room temperature and filtered. The filtrate is evaporated and the residue extracted with several portions of absolute ethanol. The extracts are combined and then evaporated to dryness. The residue (8.0 parts by weight) is the hydrochloride of N-(2-tetrahydropyranyl) 2-aminoacetamide which after two recrystallizations from absolute ethanol gave a melting point of 168.8–169.2° C.

To a suitable reaction vessel equipped with an agitator is charged 1 part by weight of the hydrochloride of N-(2-tetrahydropyranyl) 2-aminoacetamide, 10 parts by weight of a cation exchanger-resin (sulfonated copolymer of styrene and divinyl benzene) and 50 parts by weight of water. The mass is agitated at room temperature for about 45 minutes and then filtered. The filter cake is washed with water and the washings combined with the original filtrate. The aqueous solution is then stripped of water. The residue, an amber oil, is N-(2-tetrahydropyranyl) 2-aminoacetamide.

*Example VI*

Employing the procedure of Example V but replacing N-(2-tetrahydropyranyl) 2-chloroacetamide with a substantially equimolecular amount of N-(2-tetrahydrofuranyl) 2-chloroacetamide there is obtained N-(2-tetrahydrofuranyl) 2-aminoacetamide.

The 2-aminoacetamides of this invention are fungicides. For example at a concentration of 0.1 percent N-(2-tetrahydropyranyl) 2-aminoacetamide is effective in controlling tomato leaf spot, *Stemphylium solani,* and at a concentration of 0.1 percent N-(2-tetrahydropyranyl) 2-(allylamino)acetamide is effective in controlling wheat rust, *Puccinia recondita.*

What is claimed is:
1. A 2-aminoacetamide of the formula

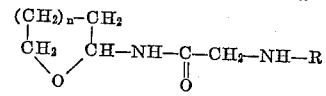

wherein *n* is a whole number from 1 to 2 and wherein R is selected from the group consisting of hydrogen and lower aliphatic hydrocarbon radicals.

2. N - (2 - tetrahydrofuranyl) - 2 - (allylamino)acetamide.

3. N - (2 - tetrahydropyranyl) - 2 - (allylamino)acetamide.

4. N-(2-tetrahydropyranyl)-2-aminoacetamide.

5. N-(2-tetrahydrofuranyl)-2-aminoacetamide.

No references cited.